June 26, 1962   H. E. BALSIGER   3,040,486
PRESSURE OPERATED WORK CLAMP FOR RING GRINDING MACHINES
Filed Sept. 12, 1958   3 Sheets-Sheet 1
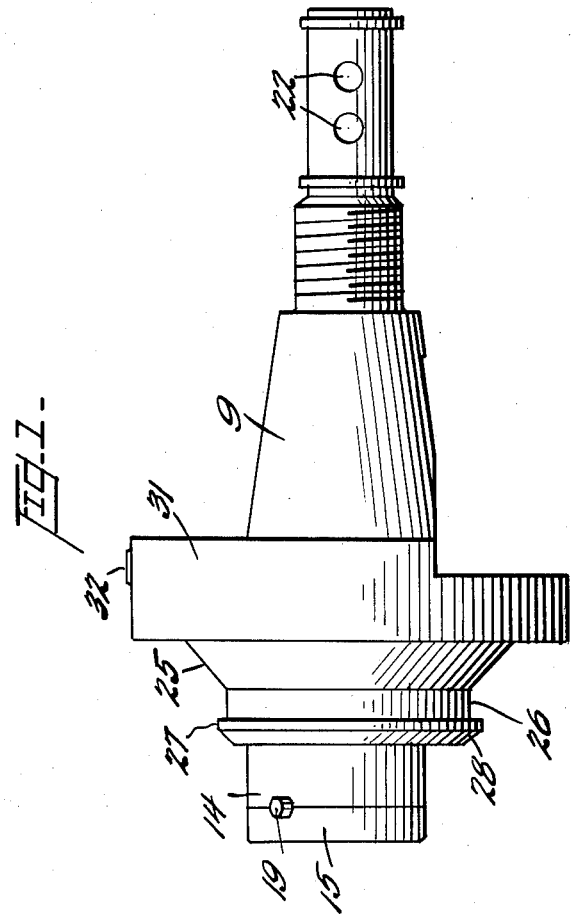
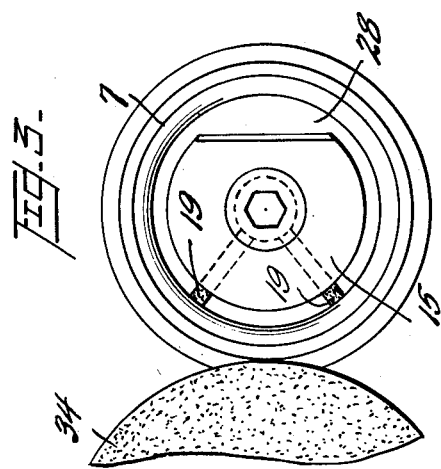
INVENTOR
*H. E. Balsiger,*
BY *Mason, Porter, Miller & Stewart*
ATTORNEYS June 26, 1962 H. E. BALSIGER 3,040,486
PRESSURE OPERATED WORK CLAMP FOR RING GRINDING MACHINES
Filed Sept. 12, 1958 3 Sheets-Sheet 2
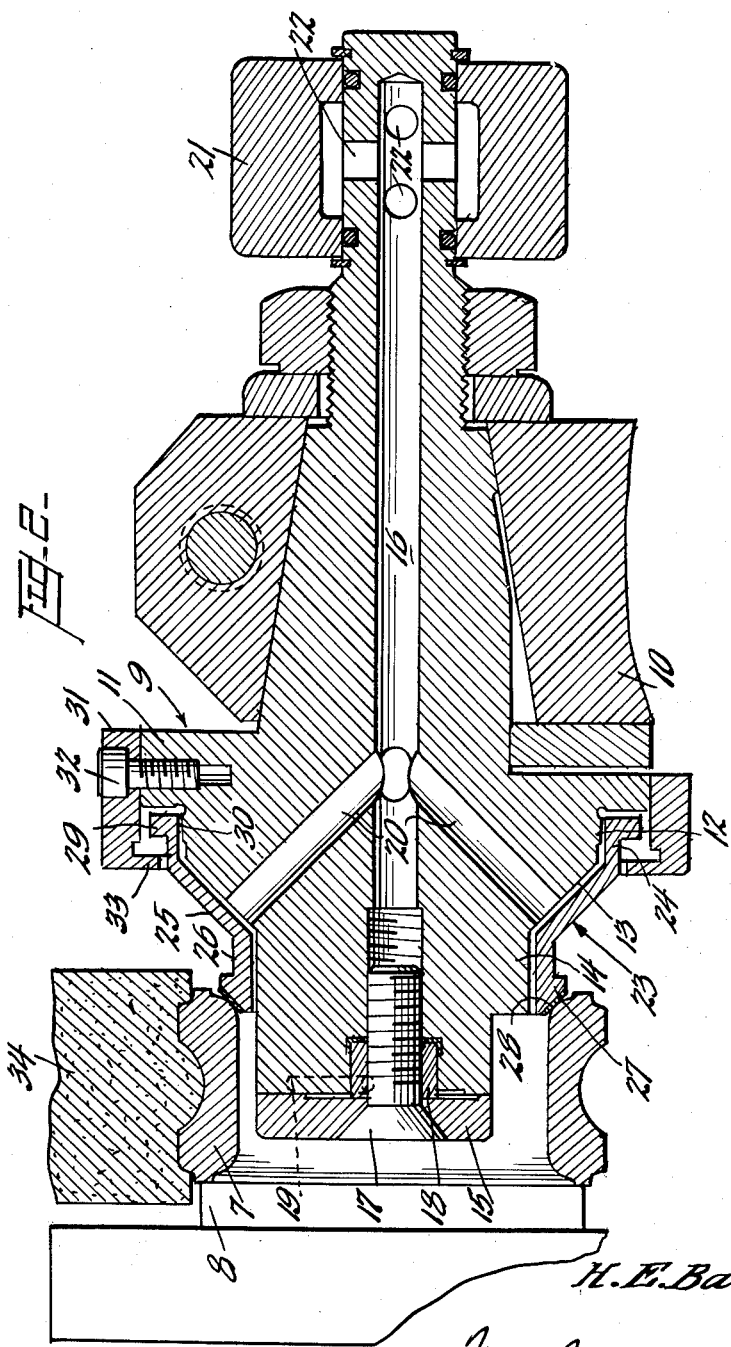
INVENTOR
H. E. Balsiger
BY Mason, Porter, Miller & Stewart
ATTORNEYS

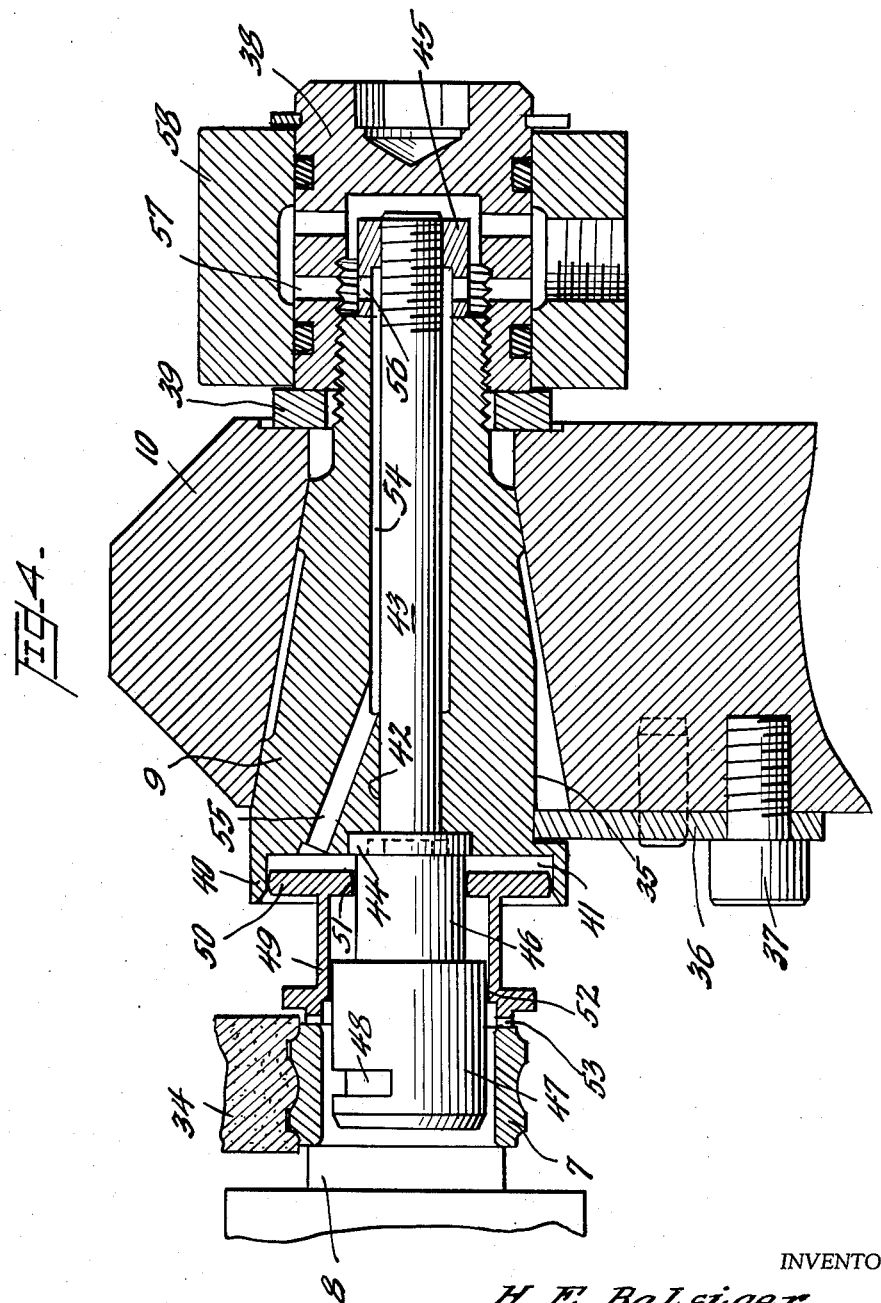

3,040,486
PRESSURE OPERATED WORK CLAMP FOR RING GRINDING MACHINES

Harold E. Balsiger, Waynesboro, Pa., assignor to Landis Tool Company, Waynesboro, Pa.
Filed Sept. 12, 1958, Ser. No. 760,781
1 Claim. (Cl. 51—236)

The invention of which the following is a detailed specification, is that of a pressure operated work clamping device for ring grinding machines. In the grinding of the peripheral surface of small, round objects such as the inner races of roller bearings and the like, it is the practice to present the workpiece to a rotary chuck or headstock by means of a loading arm on the concentric grinding machine. Generally the chuck is magnetic and will hold the workpiece in the axial position against the grinding wheel when the latter is brought up into position. However, due to the small surface of the chuck engaged by the relatively small and thin workpiece, the magnetic force holding the latter is very slight. It has been found that this is sometimes insufficient to hold the workpiece satisfactorily in position against the grinding wheel.

It is therefore an object of the invention to supply added force to hold the workpiece firmly against the rotating chuck.

A still further object of the invention is to maintain such engagement between the workpiece and chuck that the latter may in fact be a non-magnetic chuck, thus avoiding the necessity of using a magnetic chuck for this purpose.

Among the objects of my invention is to facilitate the withdrawal of the work-holding member at the conclusion of the grinding operation and thus to free the workpiece from engagement with the chuck and permit its ready removal by a rocking movement of the loading arm.

A still further object of the invention is to use the work-holding member as an ejector of the finished workpiece.

In the present invention, workpieces are supported on their internal surfaces during a grinding operation. The inside diameters of successive workpieces may vary within the prescribed tolerance. Since the position of the internal supporting member is fixed, the radial position of each workpiece of different bore diameter will be different. The holding member must have sufficient clearance on the spindle so that it can adjust itself radially by at least said prescribed tolerance. This clearance is much greater than conventional bearing clearance for the same diameter.

A still further object is to provide a work holding member which may be moved radially on the spindle.

These and other incidental purposes of the invention will be apparent from the following description of the preferred form as illustrated by way of example on the accompanying drawings in which FIGURE 1 is a side elevation of the improved arbor;
FIGURE 2 is a vertical section of the arbor taken along the longitudinal axis and showing in section also the loading arm, the workpiece and associated parts;
FIGURE 3 is a front elevation of the arbor and workpiece, and
FIGURE 4 is a vertical longitudinal section of a modified form of the arbor.

In brief, the novel improvement is in providing the wear resisting arbor for a small workpiece by which the latter is held on the inside, permitting the outside to be worked upon by grinding and like operations. In order to hold the workpiece in position to be operated upon, it is urged into position by means of a movable member loosely mounted on an arbor, fluid pressure being applied to the member to provide the force with which the workpiece is held in position against a face plate. The workpiece is therefore sustained against a grinding operation and the like regardless of whether it is primarily held by a magnetic chuck. At the conclusion of the grinding operation, the pressure on the work-supporting member is released to permit ready removal of the finished workpiece.

On the drawings I have shown a workpiece 7 which by way of example is shown as the inner ring of a ball bearing. In grinding the peripheral surface of the workpiece, it is normally held up against a magnetic chuck 8 or face plate. Due to the small area in contact with the workpiece, insufficient magnetic force is applied to withstand the grinding operation. The improvement therefore provides additional force holding the workpiece 7 against the rotary face plate 8.

The workpiece is brought up into position opposite the face plate 8 by means of arbor 14 on spindle 9 similar to the spindle shown in the patent to G.M. Snyder March 11, 1958, No. 2,826,017. This spindle is clamped in a loading arm 10, such as that shown in Patent No. 2,694,883, granted November 23, 1954, and in Patent No. 2,874,518, granted February 24, 1959, and which forms a part of the loading device of a concentric grinding machine. In grinding position, the axial relation of arbor 14 and face plate 8 is the same as that described in Patent No. 2,694,883.

The spindle 9 is provided with an extended lateral flange 11. Forward of this flange is a short cylindrical section 12. The spindle tapers conically beyond the cylindrical section to form a tapering conical portion 13. The portion 13 ends in an arbor 14 which is of cylindrical form and reduced diameter.

A cap 15 is mounted on the front of the arbor 14.

There is an axial bore 16 running through the arbor 14 on the spindle 9. The front portion of the bore is screw-threaded to receive a central screw 17 having a countersunk head.

A cylindrical bushing 18 surrounds the front of the bore 16.

Two peripherally spaced shoes 19, 19 extend radially through the front of the arbor 14 and extend slightly beyond the periphery thereof. These shoes abut the bushing 18.

Radial ducts 20, 20 connect the axial bore 16 with the surface of the conical section 13.

An air pressure manifold 21 is frictionally mounted upon the rear end of the spindle 9. Ports 22, 22 connect the bore 16 with the inner passageway in the manifold 21.

A thimble 23 is loosely carried on the front portions of the spindle 9. This thimble conforms generally to the front portions of the spindle 9 in that it has a cylindrical section 24, a tapering section 25 and a reduced cylindrical section 26. The several parts are slightly spaced from the portions of the spindle, so that the air pressure through the ducts 20, 20 serves normally to push the thimble forward over the spindle subject only to the minor escape of the pressure fluid between the arbor 14 and the reduced section 26. The escaping fluid flows at a rate sufficient to support thimble 23 in floating relation to spindle 9 so that said thimble may adjust itself to workpieces of different diameters.

The front end of the section 26 has an outwardly extending collar 27. The front edge 28 of this collar 27 is tapered. This tapered surface consists of an overlay of hardened material or alternatively, the edge 28 may itself be hardened.

The rear edge of the thimble 23 is flared outwardly to provide a rear flange 29.

Inwardly of the flange 29 the section 24 carries a rib or land 30. This has a minimum clearance around the section 12. In this way some air under pressure will escape rearwardly and form a floating support, thus minimizing friction between the fixed spindle 9 and the thimble 23. This minimum clearance also causes pressure to build up between spindle 9 and thimble 23. The latter floats and is thus free to rotate and move radially with the workpiece 7 subject to the rotation of the face plate 8.

A retainer 31 in the form of a circular collar is bolted as at 32 to the flange 11 of the spindle. This retainer 31 has an overhanging inwardly directed rib 33. The rib 33 projects inwardly of the rear flange 29 on the thimble. The rib 33 thus prevents the thimble from being completely separated from the spindle 9.

In operation the workpiece 7 is received on the arbor 14 and supported by the spaced shoes 19, 19. The loading arm is then rotated into place opposite the face plate 8.

Application of compressed air or other fluid under pressure through the ducts 20, 20, urges the thimble 23 against the side of the workpiece. The latter is thus clamped against the face plate 8.

In this position there is no escape of pressure fluid between the face plate and the workpiece in any material amount. Some slight fluid pressure passes between the surface 12 and the rib 30, there being a clearance at this point between .0012 and .0017 in. This film of air thus becomes an air cushion for floatingly supporting thimble 23 and minimizes friction at this point. It will be understood that the face plate 8 rotates, carrying the workpiece with it. The thimble 23 is constrained to rotate with and center itself on the workpiece 7 by the engagement at the surface 28.

The hardened face 28 on the thimble resists wear when the thimble and workpiece rotate separately at the moments of engagement and disengagement. However, the thimble holds the workpiece securely against the face plate during the grinding operation.

On the conclusion of the grinding operation, reduction of fluid pressure releases the workpiece from the face plate. The loading arm 10 carries the workpiece away from the grinding position in an arcuate movement. An ejecting device (not shown), operable by movement of the loading arm, can then be applied to dislodge the workpiece from the shoes 19, 19 and eject the workpiece.

During the grinding oepration the workpiece may also be held toward the grinding wheel 34 by a member diametrically located therefrom and which may be fixedly mounted or form part of the loading arm.

In the form of the invention illustrated on FIGURE 4, a different arrangement of the clamping member has been shown. The spindle 9 is fitted in the loading arm 10 as before. The angular position of the spindle 9 is determined by the flat 35 provided on one side of the spindle. This flat rests upon a plate 36 which is held on the front face of the loading arm 10 by means of the bolts 37.

The rear end of the spindle 9 is held in place by means of a rear nut 38 and a washer 39 resting against the rear face of the loading arm 10.

The front face of the spindle 9 is cut away to form an integral rim 40, thus forming a pressure cylinder 41.

The spindle is cut away to form an axial bore 42 in which a shaft 43 rests. The front of the shaft 43 is enlarged to form a flange 44 which is held in a recess of the spindle.

At the rear the shaft 43 projects beyond the spindle 9 and receives a nut 45 in a central cavity of the nut 38.

The front of the shaft 43 is enlarged to form a cylindrical portion 46 concentric with the pressure cylinder 41. The shaft beyond the portion 46 is stepped up or enlarged to form an arbor 47. This arbor carries two shoes 48, one in the upper and one in the lower quadrant of the arbor adjacent the grinding wheel.

A sleeve or piston 49 is slidably carried upon the portion 46 and the arbor 47. The piston has a rear plate or head 50. This head extends inwardly from the piston 49 to form an inner slide bearing 51 loosely riding upon the cylindrical portion 46. The plate 50 also has a slight clearance from the inner wall of the pressure cylinder 41.

The front of the piston 49 forms a second slide bearing 52 which rides loosely upon the cylindrical surface of the arbor 47. A wear face 53 with radial vent openings is formed on the front of the piston 49 and made of hardened material, or the piston itself may be hardened at this point.

The axial bore 42 over the greater part of its rear extent is enlarged to form a passageway 54. This passageway connects at the front through ducts 55 to the pressure cylinder 41. At the rear the passageway 54 is connected to the recess of the nut 38 by means of ducts 56.

The recess in the rear nut 38 is also connected by passageways 57 to a slidably mounted manifold 58 on the rear nut 38.

By the application of compressed fluid such as air through the manifold 58, pressure is applied at the rear of the pressure cylinder 41 and thus the thimble 49 is advanced over the portion 46 of shaft 43. Likewise the front of the thimble rides over the arbor 47 and brings the hardened wear face 53 against the side of the workpiece 7. The latter in turn is thus clamped upon the face plate 8 in proper position opposite the grinding wheel 34.

In both forms of the invention the workpiece is clamped laterally against the face plate of the head stock or chuck by a floating member carried on the spindle but free to rotate with the workpiece. The member is supported by an air cushion at all points so that there is no friction with the fixed spindle. The pressure is supplied by a fluid such as compressed air acting on the rear surface of the floating member. By collaps of the fluid pressure the clamping effect is immediately stopped and the workpiece is then free to be withdrawn from the grinding position and removed from the equipment.

The preferred form of the invention has been illustrated by way of example. In minor details, however, wide latitude is possible in the design of the individual parts, relative sizes and materials, without departing from the scope of the invention as defined in the following claims.

What I claim is:

A holding device for holding an annular workpiece in a grinding machine comprising a rotatable face plate, a loading arm mounted independently of said face plate, a non-rotatable spindle in said loading arm, said spindle having a projecting end portion, means on the projecting end portion of said spindle for engaging and supporting said workpiece at angularly spaced points on its internal surface, a tubular holding member sapced rearwardly of said work-engaging means and surrounding said spindle and slidably and rotatably mounted thereon for rotation by said workpiece and having sufficient clearance with said spindle for radial movement to adjust itself to variation in diameter of internal surfaces of different workpieces, a supply of fluid under pressure, and means for directing said fluid under pressure forwardly against said holding member and between said holding member and said spindle, said clearance providing a restriction to said flow of fluid under pressure and a corresponding increase in pressure in the direction to hold said workpiece against said face plate and in floating relation to said spindle.

References Cited in the file of this patent

UNITED STATES PATENTS

| | | |
|---|---|---|
| 2,478,607 | Theler et al. | Aug. 9, 1949 |
| 2,582,279 | Reimschissel | Jan. 15, 1952 |
| 2,694,883 | Balsiger | Nov. 23, 1954 |
| 2,723,499 | Dix | Nov. 15, 1955 |
| 2,752,801 | Olson | July 3, 1956 |
| 2,754,641 | Bidwell | July 17, 1956 |
| 2,826,017 | Snyder | Mar. 11, 1958 |
| 2,842,900 | Durland | July 15, 1958 |